Figure 1:
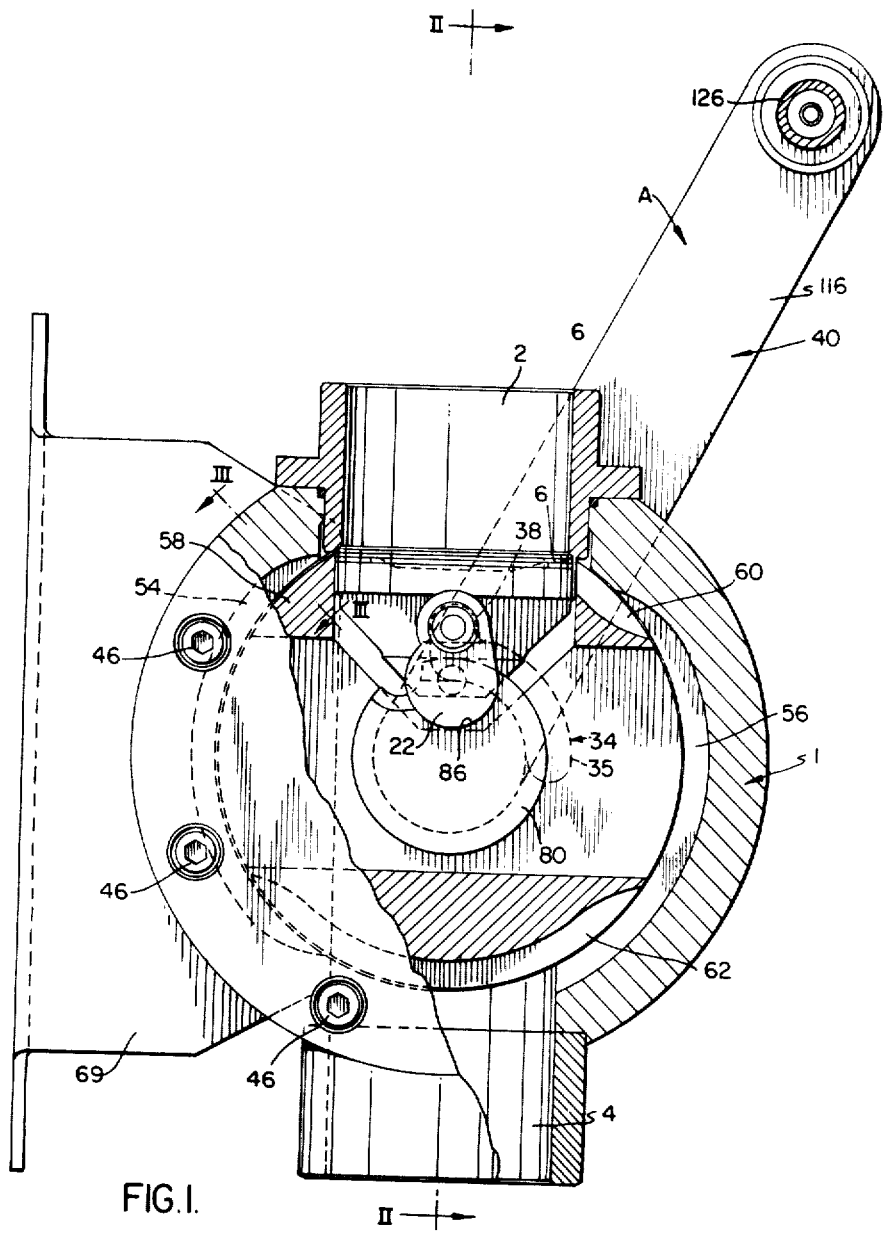

United States Patent [19]
Whittaker et al.

[11] 3,894,715
[45] July 15, 1975

[54] ROTARY VALVES

[75] Inventors: Stanley J. Whittaker; Cyril J. Astill, both of Deep River, Canada

[73] Assignee: Atomic Energy of Canada Limited, Ottawa, Canada

[22] Filed: Dec. 18, 1974

[21] Appl. No.: 533,814

Related U.S. Application Data

[63] Continuation-in-part of Ser. No. 418,613, Nov. 23, 1973, abandoned.

[30] Foreign Application Priority Data
Mar. 14, 1973 Canada .............................. 166115

[52] U.S. Cl. .................. 251/86; 251/163; 251/231
[51] Int. Cl.² .......................................... F16k 25/00
[58] Field of Search ............. 251/86, 162, 163, 231

[56] References Cited
UNITED STATES PATENTS

| | | | |
|---|---|---|---|
| 1,964,836 | 7/1934 | Wheaton | 251/231 X |
| 2,501,635 | 3/1950 | Schmidt | 251/163 |
| 2,505,998 | 5/1950 | Sleeper | 251/163 |
| 3,675,894 | 7/1972 | Friedell | 251/163 |
| 3,746,302 | 7/1973 | Larsen | 251/163 X |
| 3,776,505 | 12/1973 | Nakauishi | 251/163 |

*Primary Examiner*—Harold W. Weakley
*Attorney, Agent, or Firm*—Francis W. Lemon

[57] ABSTRACT

A rotary valve having a plug rotatably mounted in a casing by two shafts, one extending through each side of the casing, and a piston radially displaceable in a recess in the plug at a position circumferentially displaced from a fluid passage in the plug. Two links are pivotally attached at their inner ends to the shafts at an off-center position, and the other ends of the links are pivotally attached to the piston by cam track followers located in cam tracks on the casing. The cam tracks have corner portions leading from the sealing surface and then curved portions extending round the axis of rotation of the plug. Rotation of the shafts by a handle, from the valve closed position, draws the piston into the recess and away from a sealing surface around the casing fluid inlet, by the cam followers moving inwardly along the corner portions of the cam tracks, and then continuing along the curved portions to align the plug fluid passage with the casing inlet and outlet so that the valve is opened. The two links draw the piston into the recess by relative rotation between the shafts and the plug, and the plug is then aligned with the casing inlet and outlet by the shafts and plug rotating together.

5 Claims, 3 Drawing Figures

FIG.1.

ROTARY VALVES

This application is a continuation-in-part of application Ser. No. 418,613, filed 11/23/73, now abandoned.

This invention relates to rotary valves.

There is a need for a rotary valve having a high reliability for the containment of fluids in a fluid-tight manner. For example, there is a particular need for a rotary valve having a high reliability for the containment of fluids in a fluidtight manner for use in nuclear reactors, for the containment of costly heavy water, fluids such as tritium having high toxicity, and other applications where liquids or gases having high toxicity, corrosiveness or pollutant properties must be contained.

It is an object of the present invention to provide a rotary valve having high reliability for the containment of fluids in a fluidtight manner.

It is a further object of the present invention to provide a rotary valve having high reliability for the containment of costly heavy water, fluids such as tritium having high toxicity, and other applications where liquids or gas having high toxicity, corrosiveness or pollutant properties must be contained.

It would also be desirable to provide a rotary valve with which there is substantially no rubbing or scuffing between the sealing surfaces during opening or closing the valve, which could damage the sealing surfaces and cause leakage.

It is a further object of the present invention to provide a rotary valve with which there is substantially no rubbing or scuffing between the sealing surfaces during opening or closing of the valve, which could damage the sealing surfaces and cause leakage.

According to the present invention there is provided a rotary valve, comprising a valve casing having a fluid inlet, a fluid outlet and an inwardly facing sealing surface around the fluid inlet, a plug in the casing and having a fluid passage for alignment with the fluid inlet and fluid outlet, two shafts rotatably mounted in a fluidtight manner in and extending through the valve casing on each side of the plug, the plug being mounted in the casing by the shafts and rotatable with respect to the shafts, a valve closure assembly slidably located in a radially extending recessed portion of the plug with the recessed portion circumferentially spaced around the plug from the fluid passage therein, the valve closure assembly being slidably located for movement into sealing engagement with the sealing surface, a pair of link members in the casing with the plug and valve closure assembly between them, pivot means pivotally, attaching each of the link members at their inner ends to their respective shafts on the same side of the plug as that link member for rotation about an axis parallel to the axis of rotation of the plug, cam track following means pivotally attaching the outer ends of the link members to the valve closure assembly, through slots extending radially along the axis of the recessed portion, for rotation about an axis parallel to the axis of rotation of the plug, two cam tracks facing one another from the inside of the casing with one of the cam tracks on each side of the plug and the cam track following means slidably located at each end in the cam tracks, the cam tracks having corner portions adjacent the fluid inlet, leading away from the sealing surface, and then curved portions extending around the axis of rotation of the plug to the position where the valve is fully open, and valve actuating means for rotating the shafts together, and whereby rotation of the shafts by the valve actuating means, from the closed position of the valve, causes the link members first to be guided over top dead center and inwardly by the cam following means moving inwardly around the cam track corner portions so that the valve closure assembly is released inwardly from sealing engagement with the sealing surface and slid into the recessed portion by relative rotation between the shafts and the plug, and further rotation of the shafts causes the links to move the cam track following means around the cam track curved portions and align the fluid passage of the plug with the fluid inlet and outlet passages, and reverse rotation of the shafts reverses this sequence until the valve assembly is snapped into sealing engagement with the sealing surface by the link members snapping over top dead center.

Figure 2:
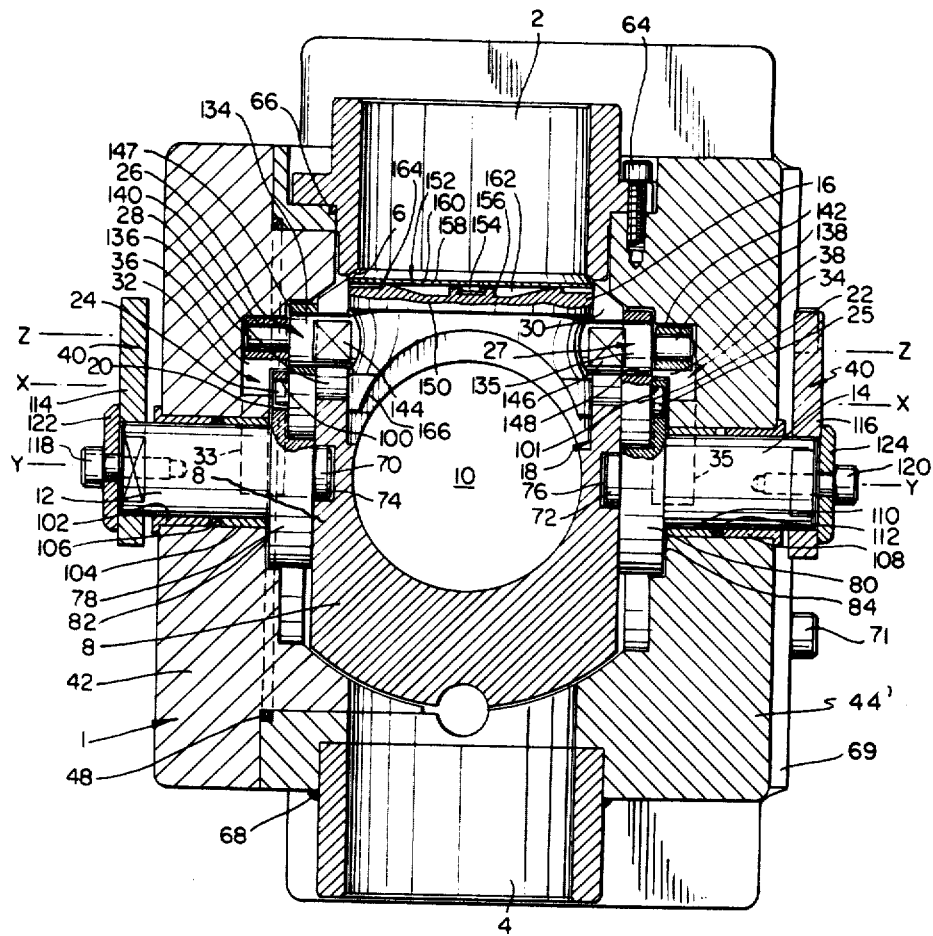
Figure 3:
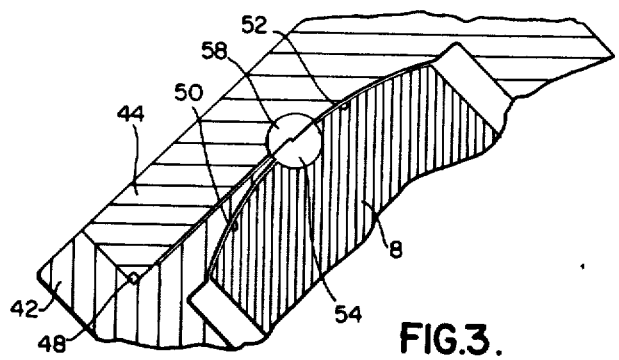

In the accompanying drawings which illustrate, by way of example, an embodiment of the present invention:

FIG. 1 is a partly sectioned side view of a rotary valve in the closed position, FIG. 2 is a part sectional end view along II—II, FIG. 1, and FIG. 3 is a sectional side view along III—III, FIG. 1 showing portions only of the valve casing and plug.

Referring now to FIGS. 1 and 3 there is shown a rotary valve with a rotary valve casing generally designated 1 having a fluid inlet 2, a fluid outlet 4 and an inwardly facing sealing surface 6 around the fluid inlet 2. A plug 8 is in the casing 1 and has a fluid passage 10 for alignment with the fluid inlet 2 and the fluid outlet 4. Two shafts 12 and 14 are rotatably mounted in a fluidtight manner in and extend through the casing 1 on each side of the plug 8. The plug 8 is mounted in the casing 1 by the shafts 12 and 14 and is rotatable with respect to the shafts 12 and 14. A valve closure assembly generally designated 16, is slidably located in a radially extending recessed portion 18 of the plug 8 with the recessed portion 18 circumferentially spaced around the plug 8 from the fluid passage 10 therein. As will be described later, the valve closure assembly 16 is slidably located for movement into sealing engagement with the sealing surface 6. A pair of link members 20 and 22 are in the casing 1 with the plug 8 and the valve closure assembly 16 between them. Pivot means 24 and 25 pivotally attach each of the links 20 and 22 at their inner ends to their respective shafts 12 and 14 on the same side of the plus 8 as that link 20 or 22, for rotation about an axis XX parallel to the axis YY of rotation of the plug 8. Cam track following means, generally designated 26, 27, pivotally attaches the outer ends of the links 20 and 22 to the valve closure assembly 16, through slots 28 and 30 in the plug 8 and extending radially along the axis of the recessed portion 18, for rotation about an axis ZZ parallel to the axis YY of rotation of the plug 8. Two cam tracks 32 and 34 face one another from the inside of the casing 1 with one of the cam track following means 26 slidably located at each end in the cam tracks 32 and 34. The cam tracks 32 and 34 have corner portions 36 and 38, respectively, adjacent the fluid inlet 2, leading away from the sealing surface 6 in an axially in line direction therefrom and then curved portions 33 and 35, respectively, extending around the axis YY of rotation of the plug 8 to the position where the valve is fully opened. Valve actuating means, generally designated 40, are provided for rotating the shafts 12 and 14 together.

The valve casing 1 has two side portions 42 and 44 secured together by bolts, some of which are shown and designated 46, and sealed to one another by O-ring seal 48. As shown in FIG. 3 the portion 42 locates inside the portion 44 to provide close fitting, spaced curved surfaces 50 and 52 respectively for the plug 8. The side portions 42 and 44 together provide leakage grooves 54 and 56 which during rotation of the plug 8 align with leakage grooves 58, 60 and 62 in the plug 8 as will be described later.

The fluid inlet 2 is removably secured to the side portion 44 by bolts, one of which is shown and designated 64, and is sealed to the side portion 44 by an O-ring seal 66. The fluid outlet 4 is welded to the side portion 44 by a weld 68. The casing 1 has a mounting bracket 69 secured to the casing by screws, one of which is shown and designated 71.

The plug 8 is rotatably mounted by end portions 70 and 72 of the shafts 12 and 14, respectively, locating in bores 74 and 76 in the plug 8. The shafts 12 and 14 have annular flanges 78 and 80, respectively, which are separated from the casing 1 by discs 82 and 84, respectively, of a bearing material. The annular flanges 78 and 80 each have a shaped recess, the one for the annular flanges 80 only is shown and designated 86 (FIG. 1), for providing an unobstructed path for the links 20 and 22. Both of the links 20 and 22 are pivotally attached to the annular flanges 78 and 80, by the pivots 24 and 25 which are stub axles rotatably located in a bores 100 and 101 in the flange 78 and 80. The shaft 12 is rotatably located in the casing 1 by bearings 102 and 104 and is sealed therein by an O-ring seal 106, and the shaft 14 is similarly located and sealed by bearings 108 and 110 and seal 112. The outer ends of the shafts 12 and 14, have levers 114 and 116, respectively, secured on them by screws 118 and 120 and washers 122 and 124. The levers 114 and 116 are secured on the shafts 12 and 14 to rotate with them, and are joined by a handle 126. Lever 116 is preferably held against movement by a plug, which is removably secured in either of two bores positioned in the casing 1 at the open and closed positions for the lever 116.

The cam track following means 26, 27 comprises two trunions 134 and 135, integral with a piston 150 of the valve closure assembly 16, and two rollers 140 and 142 rotatably mounted on end portions 136 and 138 respectively of the trunions 134 and 135. The trunions 134 and 135 have flat sides 144 and 146 respectively to be slidable along, but not rotatable in, in the slots 28 and 30 respectively. The trunions 134 and 135 are rotatable in bores 147 and 148 in the annular flanges 78 and 80 respectively.

The valve closure assembly 16 comprises the piston 150 slidably located in the recessed portion 18, and a valve closure 152 tiltably secured to the piston 150 by a stud 154 in a keyhole slot member 156 on the piston 150. The valve closure 152 comprises a metal valve closure diaphragm 158 with a sealing surface 160. The piston 116 has a shallow, central concavity 162 in its upper surface with an annular ridge 164 therearound spaced marginally inwardly from the sealing surface 6 and deflecting an outer rim portion of the diaphragm 158, and the same portion the sealing surface 160 downwardly, by contact with the sealing surface 6 when the valve is in the closed position and the annular ridge 164 is being urged upwardly by the piston 150. This arrangement has the advantage that fluid pressure at the fluid inlet 2 deflects the center portions of the diaphragm 158 and the sealing surface 160 downwardly and thus enhances the seal by urging the outer edges of the diaphragm 158 and the sealing surface 160 upwardly to compress the sealing surface 160 against the sealing surface 6 with greater force when the fluid pressure at the inlet 2 increases.

For reasons to be described later, the diaphragm 158 and sealing surface 160 should preferably not obscure any portion of the leakage groove 58 when the valve is in the open position. Thus with the valve in the open position the piston 150 should preferably hold the sealing surface 160 at least as low as the bottom of the leakage groove 60, and in order to do this it is necessary for the piston 150 to have a recess 166 to provide an unobstructed flow path along the fluid passage 10.

In operation, to open the valve from the closed position shown in FIGS. 1 to 3, the levers 114 and 116 are pulled by the handle 126 in the direction of arrow A, FIG. 1 and 3, to rotate the shafts 12 and 14.

For about the first two degrees of rotary movement of the shafts 12 and 14 the links 20 ans 22 are drawn over top dead center, that is, from the over center position inclining downwardly to the left (FIG. 3) to be inclining downwardly to the right, and thus unlock the valve closure assembly 16 from the sealing surface 6. Continued rotary movement of the shafts 12 and 14 for approximately the next eight degrees causes the rollers 140 and 142 to be pulled radially inwardly, by the links 20 and 22, along the corner portions 36 and 38 of the cam tracks 32 and 34, respectively, so that the links 20 and 22, release the valve closure assembly 16 from sealing engagement with the sealing surface 6, and slide the valve closure assembly 16 only in a radially inwardly direction, that is only in an axially in line direction away from the sealing surface 6, into the recessed portion 18 until the rollers 140 and 142 have moved to the bottoms of the corner portions 36 and 38 respectively. This is caused by relative movement between the plug 8 and the shafts 12 and 14 with the plug 8 stationary.

Then the valve closure assembly has moved radially inwardly to the inner limit by the rollers 140 and 142 having moved to the bottoms of the corner portions 36 and 38 respectively, the plug 8 starts to be pulled round by the rollers 140 and 142 moving along the cam tracks 32 and 34.

Continued rotary movement of the levers 114 and 116 causes the rollers 140 and 142 to be drawn along the curved portions 33 and 35 respectively. When the rollers 140 and 142 have passed completely along the curved portions 33 and 35 respectively, the fluid passage 10 is aligned with the fluid inlet and outlet passages 2 and 4 respectively, and the piston 150 is at the bottom of the recess 18. The valve is now fully opened.

It will be appreciated that by pulling the handle 126, from the open position, in the reverse direction to that of arrow A, the above sequence of movements is reversed until the links 20 and 22 snap over top dead center and lock the valve closure assembly 16 in the valve closed position.

It should be noted that as the valve 1 is being closed, fluid is allowed to pass around the leakage grooves 54, 56, 58, 60 and 62 so that there is no sudden sealing off of fluid pressure at the fluid inlet 2 during closing, and this facilitates smooth closing of the valve with an evenly applied torque to the handle 126. For this reason the diaphragm 158 and sealing surface 160 should preferably not obscure any portion of the leakage groove 58 when the valve is in the open position.

We claim:

1. A rotary valve, comprising a valve casing having a fluid inlet, a fluid outlet and an inwardly facing sealing surface around the fluid inlet, a plug in the casing and having a fluid passage for alignment with the fluid inlet and fluid outlet, two shafts rotatably mounted in a fluid-tight manner in and extending through the valve casing on each side of the plug, the plug being mounted in the casing by the shafts and rotatable with respect to the shafts, a valve closure assembly slidably located in a radially extending recessed portion of the plug with the recessed portion circumferentially spaced around the plug from the fluid passage therein, the valve closure assembly being slidably located for movement into sealing engagement with the sealing surface, a pair of link members in the casing with the plug and valve closure assembly between them, pivot means pivotally attaching each of the link members at their inner ends to their respective shafts on the same side of the plug as that link member for rotation about an axis parallel to the axis of rotation of the plug, cam track following means pivotally attaching the outer ends of the link members to the valve closure assembly, through slots extending radially along the axis of the recessed portion, for rotation about an axis parallel to the axis of rotation of the plug, two cam tracks facing one another from the inside of the casing with one of the cam tracks on each side of the plug and the cam track following means slidably located at each end in the cam tracks, the cam tracks having corner portions adjacent the fluid inlet, leading in an axially in line direction away from the sealing surface, and then curved portions extending around the axis of rotation of the plug to the position where the valve is fully open, and valve actuating means for rotating the shafts together and whereby rotation of the shafts by the valve actuating means, from the closed position of the valve, causes the link members first to be guided over top dead center and inwardly by the cam following means moving inwardly around the cam track corner portions so that the valve closure assembly is released inwardly from sealing engagement with the sealing surface and moved only in an axially in line direction away from the sealing surface into the recessed portion by relative rotation between the shafts and the plug with the plug stationary, and further rotation of the shafts causes the links to move the cam track following means around the cam track curved portions and align the fluid passage of the plug with the fluid inlet and outlet passages by rotation of plug, and reverse rotation of the shafts reverses this sequence until the valve closure assembly is snapped into sealing engagement with the sealing surface by the link members snapping over top dead center.

2. A rotary valve according to claim 1, wherein fluid leakage grooves extend circumferentially around the plug to leak fluid from the fluid inlet to the fluid outlet during closure of the valve.

3. A rotary valve according to claim 1, wherein each shaft has an annular flange separating the casing from the plug, the pivot means pivotally attaches the inner ends of the link members to the annular flanges, and each flange has a shaped recess to provide an unobstructed path for the respective link member.

4. A rotary valve according to claim 1, wherein the valve closure assembly comprises a piston slidably located in the recess, and a valve closure diaphragn tiltably secured to the piston to lie flush with the sealing surface.

5. A rotary valve according to claim 4, wherein the piston has a shallow central concavity adjacent the diaphragm, and an annular ridge around the concavity and spaced marginally inwardly from the sealing surface for deflecting an outer rim portion of the diaphragm by contact with the sealing surface when the valve is closed.

* * * * *